(12) United States Patent
Saponja et al.

(10) Patent No.: US 11,895,995 B2
(45) Date of Patent: Feb. 13, 2024

(54) FISHING LURE SHEET

(71) Applicant: Jeffrey Charles Saponja, Invermere (CA)

(72) Inventors: Jeffrey Charles Saponja, Invermere (CA); Darren Mark Krein, Invermere (CA)

(73) Assignee: Jeffrey Saponja, Invermere (CO)

( * ) Notice: Subject to any disclaimer, the term of this patent is extended or adjusted under 35 U.S.C. 154(b) by 227 days.

(21) Appl. No.: 17/170,653

(22) Filed: Feb. 8, 2021

(65) Prior Publication Data
US 2022/0007623 A1 Jan. 13, 2022

Related U.S. Application Data

(60) Provisional application No. 62/971,568, filed on Feb. 7, 2020.

(51) Int. Cl.
*A01K 85/00* (2006.01)

(52) U.S. Cl.
CPC .................. *A01K 85/00* (2013.01)

(58) Field of Classification Search
CPC .............................. A01K 85/00; A01K 85/14
USPC ........................................................ 43/42.18
See application file for complete search history.

(56) References Cited

U.S. PATENT DOCUMENTS

| | | | |
|---|---|---|---|
| 1,569,993 A | 1/1926 | Macleod | |
| 1,921,176 A * | 8/1933 | Unkefer | A01K 85/16 43/42.48 |
| 2,599,035 A * | 6/1952 | Wing | A01K 85/16 43/42.33 |
| 2,737,750 A * | 3/1956 | Pierce | A01K 85/16 43/42.46 |
| 2,741,058 A * | 4/1956 | Allman | A01K 85/16 43/42.39 |
| 3,060,620 A * | 10/1962 | Binkowski | A01K 85/02 43/42.24 |
| 3,122,853 A * | 3/1964 | Koonz | A01K 85/14 428/30 |
| 3,245,171 A * | 4/1966 | Henry | A01K 85/00 D22/129 |
| 3,413,750 A * | 12/1968 | Henry | A01K 85/10 359/566 |
| 3,528,189 A * | 9/1970 | Lilley, Jr. | A01K 85/16 D22/133 |
| 3,540,144 A * | 11/1970 | Gurka | A01K 85/16 43/42.34 |
| 4,307,531 A * | 12/1981 | Honse | B29C 66/433 43/42.32 |
| 4,429,482 A * | 2/1984 | Honse | B29C 66/1122 43/42.32 |
| 4,471,557 A * | 9/1984 | Gage | A01K 85/14 43/42.31 |
| 4,665,642 A * | 5/1987 | Steinman | A01K 85/00 D22/133 |

(Continued)

FOREIGN PATENT DOCUMENTS

GB 2335129 9/1999

*Primary Examiner* — Christopher P Ellis
(74) *Attorney, Agent, or Firm* — Smart & Biggar LP

(57) ABSTRACT

A fishing lure sheet that includes a portion that, when folded over and joined, results in the obtaining in a fishing lure skin that defines a fishing lure passage for receiving a filament of a fishing device. The fishing lure skin simulates the appearance of an organism.

15 Claims, 11 Drawing Sheets

(56) References Cited

U.S. PATENT DOCUMENTS

| | | | | |
|---|---|---|---|---|
| 4,693,032 | A * | 9/1987 | Mattison | A01K 69/06 43/17.6 |
| 5,125,182 | A * | 6/1992 | Holder | A01K 85/00 43/42.49 |
| 5,131,182 | A * | 7/1992 | Ising | A01K 85/16 156/275.7 |
| 5,228,230 | A | 7/1993 | Vaught | |
| 6,041,540 | A * | 3/2000 | Potts | A01K 85/00 43/42.47 |
| 6,247,261 | B1 * | 6/2001 | Kechriotis | A01K 85/01 43/42.53 |
| D462,504 | S * | 9/2002 | Rudy | D1/111 |
| 6,922,939 | B2 | 8/2005 | Moorhouse | |
| 7,774,975 | B2 * | 8/2010 | Simmons | A01K 85/01 43/42.32 |
| 9,565,843 | B2 * | 2/2017 | Calabrese | A01K 85/18 |
| 2011/0296737 | A1 * | 12/2011 | Peluso | A01K 85/16 43/42.32 |
| 2013/0199079 | A1 | 8/2013 | Onofrychuk | |

* cited by examiner

FISHING LURE SHEET

CROSS-REFERENCE TO RELATED APPLICATION

This application claims the benefit of and priority to the following applications, the contents of which are incorporated herein by reference: U.S. Provisional Patent Application No. 62/971,568 entitled FISHING LURE SHEET filed Feb. 7, 2020 and Canadian Patent Application No. 3071697 entitled A FISHING LURE SHEET filed Feb. 7, 2020.

FIELD

The present disclosure is related to a fishing lure sheet.

BACKGROUND

Fisherman or recreational fishers typically use either organic matter as bait (live or otherwise) or lures designed to entice fish to bite on the hook. Depending on the type of fish being fished, the lure or bait properties may need to be adjusted in order to attract the desired species of fish. The effectiveness of the lure may depend on the water environment in which a fishing lure is to be used, a style of motion of a fishing lure, the type of fish which is sought to be caught, the type of fishing system within which the fishing lure will be used, and the ease of use of a fishing lure. Fishing lures can be expensive, difficult to assemble, non-adjustable or suffer from a lack of reusability.

SUMMARY

In one aspect there is provided a fishing lure sheet comprising:
 a foldable portion configured for folding onto itself to define a folded portion such that the fishing lure sheet becomes disposed in a folded configuration;
 wherein:
  while the sheet is disposed in the folded configuration:
   the folded portion simulates the appearance of a head of an organism;
   there is an absence of folding of a rear portion of the sheet;
   the folded portion is disposed for becoming joined to itself such that, in response to the joining, a fishing lure skin is obtained, and with effect that a stop and fishing lure passage are established;
   the fishing lure skin is configured for co-operating with a fishing device for establishing a modified fishing device configuration, wherein the fishing device includes a filament and a hook connected to the filament such that the hook translates with the filament; and
   in the modified fishing device configuration, a filament of the fishing device extends through the fishing lure passage, and movement of the filament through the fishing lure passage, in one of the directions, is prevented in response to interference between the fishing device and the stop.

In another aspect, there is provided a fishing lure sheet comprising:
 a foldable portion configured for folding onto itself to define a folded portion such that the fishing lure sheet becomes disposed in a folded configuration, the foldable portion defining a first joint counterpart and a second joint counterpart; and
 an activatable joining medium configured for effecting the joinder of the first and second joint counterparts;
 wherein:
  while the sheet is disposed in the folded configuration:
   the appearance of an organism is simulated by the sheet;
   the first and second joint counterparts are disposed for becoming joined such that, in response to the joining, a fishing lure skin is obtained, with effect that a stop and a fishing lure passage are established;
   the first joint counterpart, the second joint counterpart, and the activatable joining medium are co-operatively configured such that, while the sheet is disposed in the folded configuration and the activatable joining medium has been activated, the first and second joint counterparts are disposed for becoming joined by the joining medium such that, in response to the joining, a fishing lure skin is obtained, with effect that a stop and fishing lure passage are established;
   the fishing lure skin simulates the appearance of an organism
   the fishing lure skin is configured for co-operating with a fishing device for establishing a modified fishing device configuration, wherein the fishing device includes a filament and a hook connected to the filament such that the hook translates with the filament; and
   in the modified fishing device configuration, a filament of the fishing device extends through the fishing lure passage, and movement of the filament through the fishing lure passage, in one of the directions, is prevented in response to interference between the fishing device and the stop.

In another aspect, there is provided a kit for assembling a fishing lure for coupling to a fishing lure coupled to a fishing device including a filament, comprising:
 a fishing lure sheet;
 an anchor; and
 a fastener;
 wherein:
  the anchor includes a bushing which is mounted to the filament such that: (i) the filament is extendible through the bushing, and (ii) the anchor is moveable relative to the filament;
  the fishing lure is configured for folding onto itself to define a folded portion such that the fishing lure sheet becomes disposed in a folded configuration, such that the fishing lure sheet is configurable in a non-folded configuration and is transitionable from the non-folded configuration to the folded configuration in response to folding onto itself;
  in the folded configuration, the fishing lure sheet defines a cavity;
  the fishing lure sheet and the anchor are co-operatively configured such that, while the fishing lure sheet is disposed in the non-folded configuration, the anchor is emplaceable relative to the fishing lure sheet such that transitioning of the fishing lure sheet to the folded configuration is with effect that the anchor becomes disposed within the cavity, such that the fishing lure sheet and the anchor become disposed in a pre-assembly configuration;
  while disposed in the pre-assembly configuration, the fishing lure sheet is fastenable to the anchor with the fastener, such that the fishing lure sheet, the anchor, and the fastener are configured in a fishing lure configuration; and in the fishing lure configuration, an outermost surface is defined, and the outermost surface simulates the appearance of an organism.

BRIEF DESCRIPTION OF THE DRAWINGS

Reference will now be made, by way of example, to the accompanying drawings which show example embodiments of the present application, and in which.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
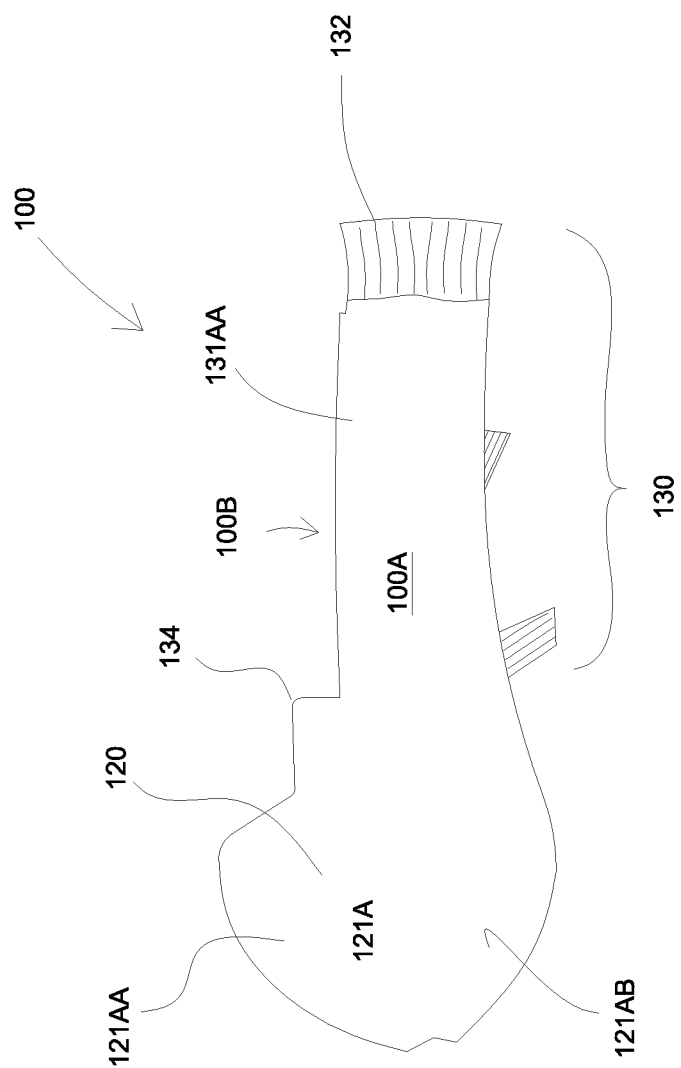
FIG. 1 is a schematic illustration of a first side of a fishing lure sheet.

Referring now to FIG. 1, a fishing lure sheet 100 is disclosed, which is configured for use with an existing fishing device 410. In some embodiments, for example, the fishing lure sheet 100 is defined by a single sheet.

Figure 4:
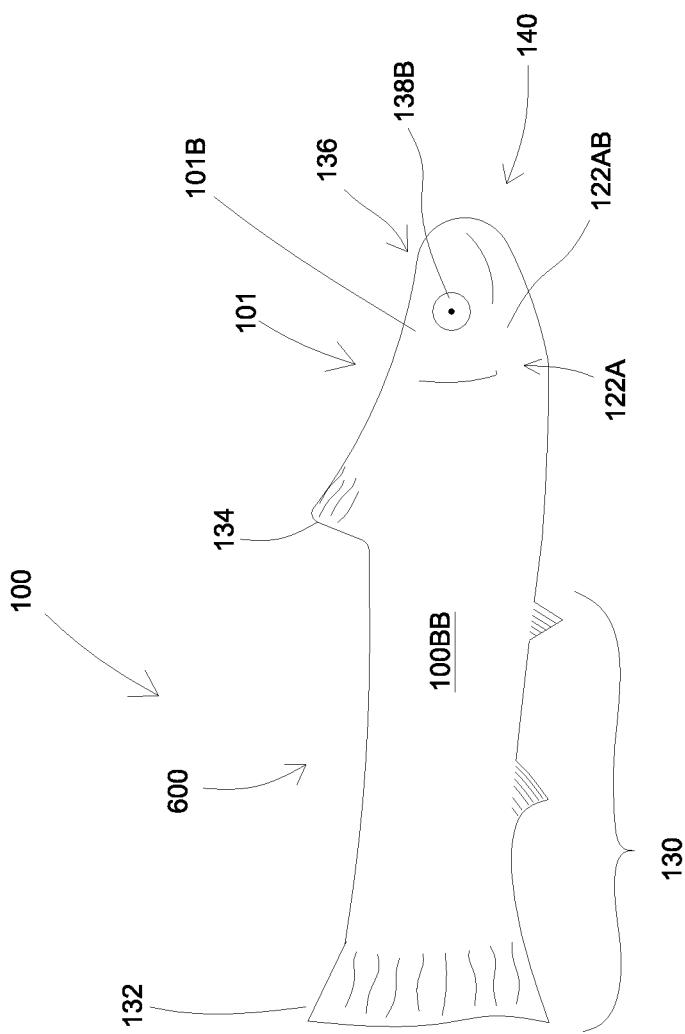
FIG. 4 is a schematic illustration of a second opposite side of the fishing lure skin of FIG. 3.
Figure 5:
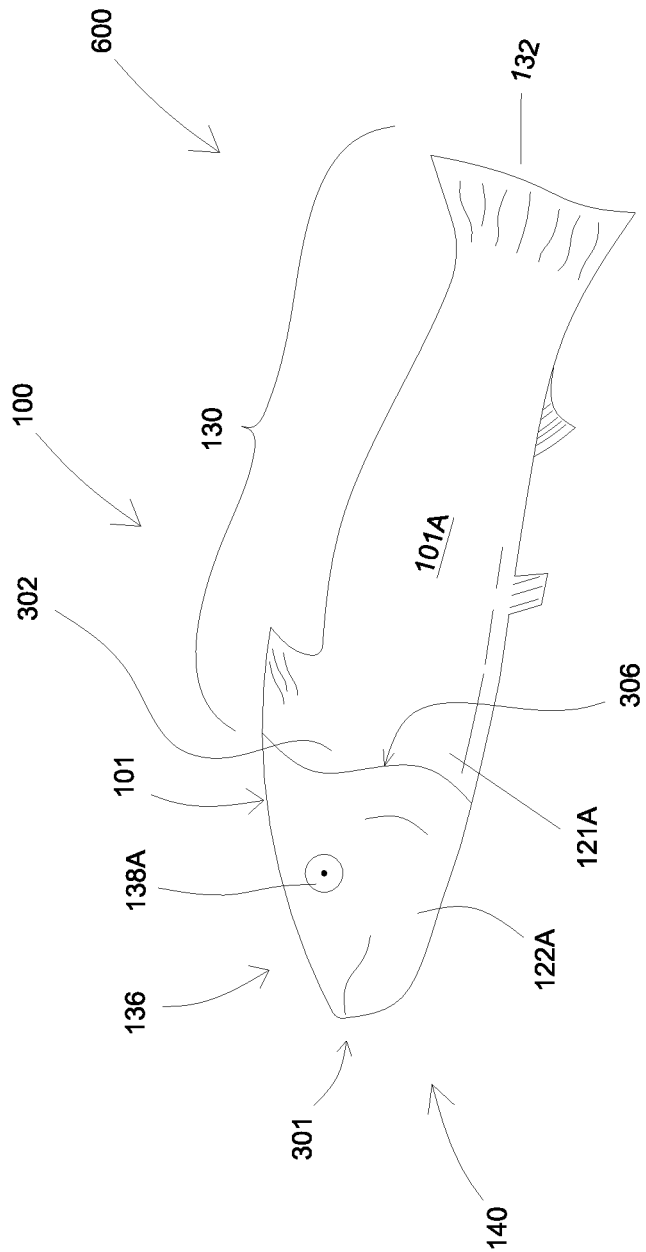
FIG. 5 is a rear perspective view of the fishing lure skin of FIG. 3.
Figure 6:
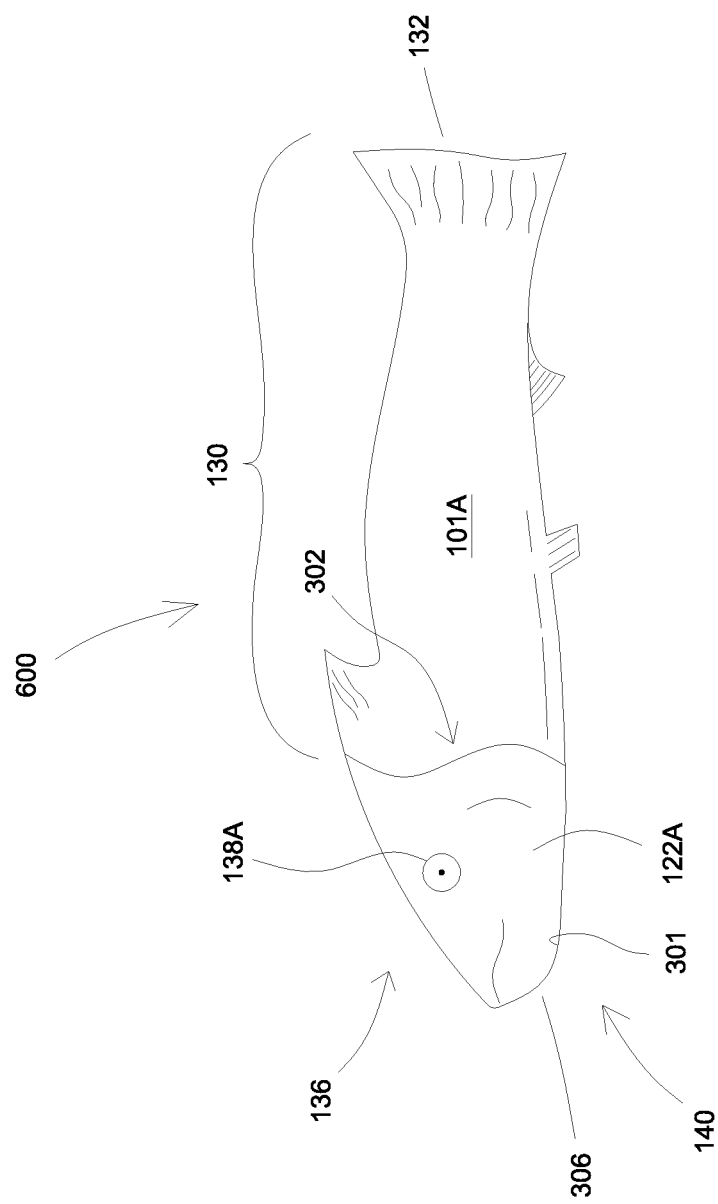
FIG. 6 is a front perspective view of the fishing lure skin of FIG. 3.
Figure 7:
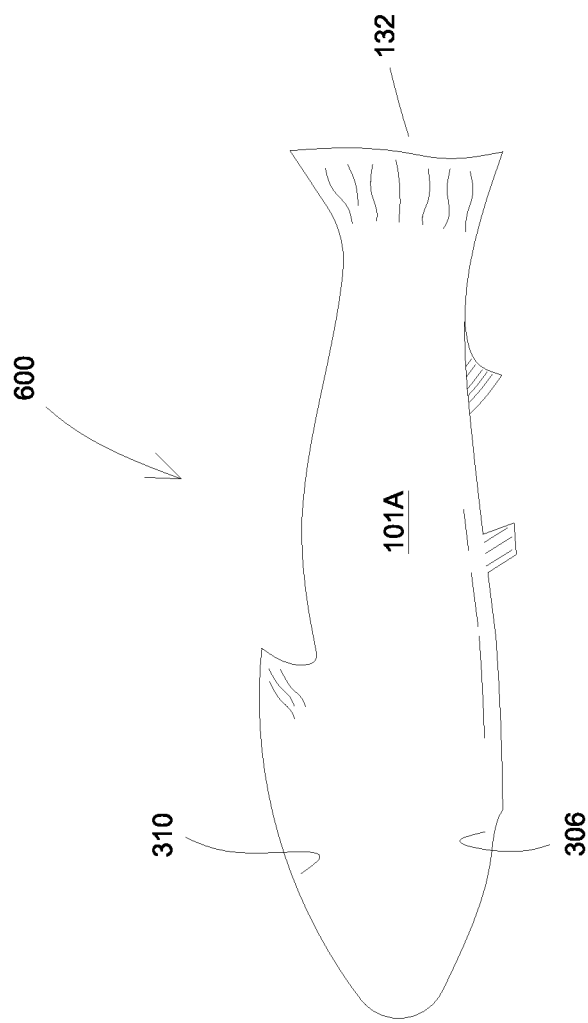
FIG. 7 is identical to FIG. 6, and illustrates a front perspective view of the fishing lure skin of FIG. 3, with the exception that the folded state first side surface portion has been removed to illustrate the stop.

The fishing device 410 includes a filament 406 (such as, for example, a wire) and a hook 404. The hook 404 is connected to the filament 406 such that the hook 404 translates with the filament 406. In some embodiments, for example, the filament 406 in includes a wire, a leader, or a line. The filament 406 may be connected to a fishing rod (not shown), or other device allowing retrieving of the hook 404 from beneath the water when fishing. In this respect, in some embodiments, for example, the filament 406 effects connection of a hook 404 to a fishing rod, or to another filament. In some embodiments, for example, the fishing device 410 may further include a weighted body 402, as shown in FIG. 4. In some embodiments, for example, the fishing device 410 includes a commercially available fishing lure configured for being encapsulated within a cavity defined within the fishing lure passage 306.

In some embodiments, for example, the fishing lure sheet 100 is made of fabric (e.g. water tolerant), cloth textile material, vinyl, canvas, plastic, rubber, or silicone. In some embodiments, for example, the material of construction of the sheet 100 is biodegradable. In some embodiments, for example, the sheet 100 comprises flexible material suitable to retaining its shape to allow for sufficient folding (see below).

In some embodiments, for example, one or both sides of the fishing lure sheet 100 is configured for simulating the appearance of an organism, such as, for example, a fish, a leach, or any other organism which is consumable by a fish. One or both sides of the fishing lure sheet 100 may also be made of a reflective material in part or in whole, and the reflective material may be used to help simulate the appearance of the skin of an organism, such as, for example, a fish, a leach, or any other organism which is consumable by a fish In some embodiments, for example, the fishing lure sheet 100 is made by cutting a sheet of material using conventional means, and simulating the appearance of an organism through subsequent printing of an image onto the material. In some embodiments, for example, the fishing lure sheet 100 is made via 3D printing. In some embodiments, for example, the fishing lure sheet 100 can be made using a material pre-prepared to simulate the appearance of an organism and, subsequent, cutting either by conventional means or through the use of a cutting apparatus.

Figure 2:
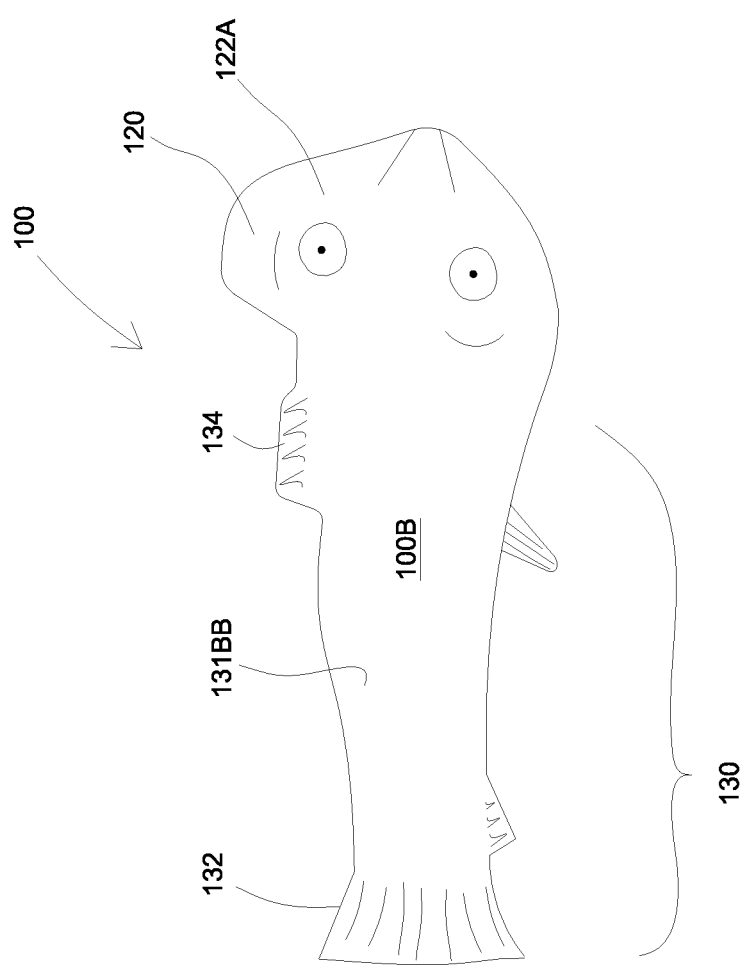
FIG. 2 is a schematic illustration of a second opposite side of the fishing lure sheet illustrated in FIG. 1.
Figure 3:
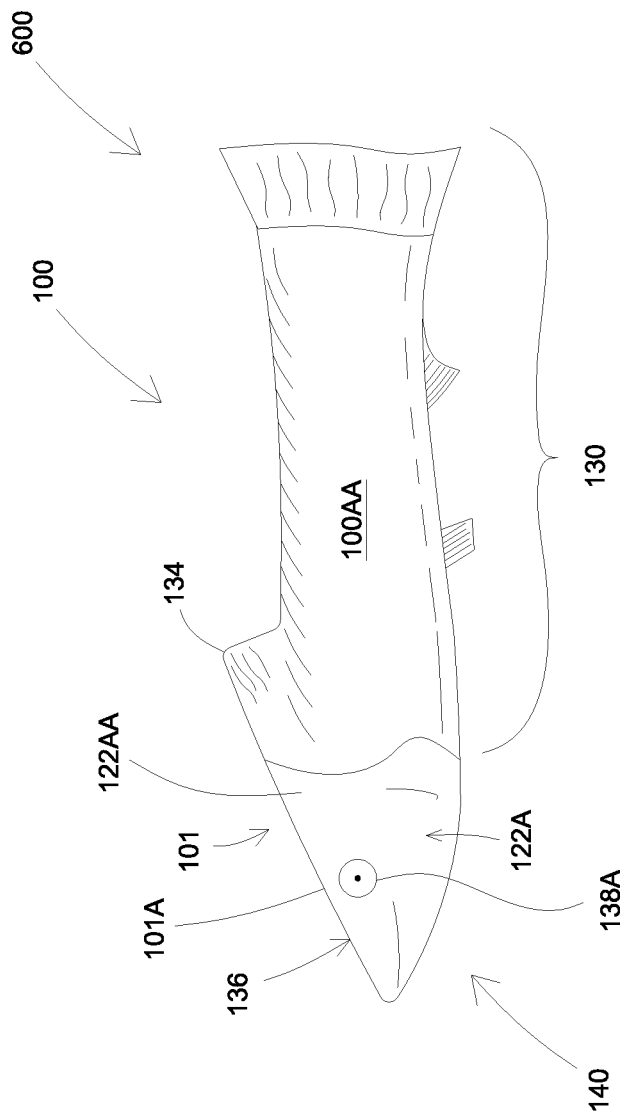
FIG. 3 is a schematic illustration of one side of a fishing lure skin formed from the fishing lure sheet of FIGS. 1 and 2.
Figure 11:
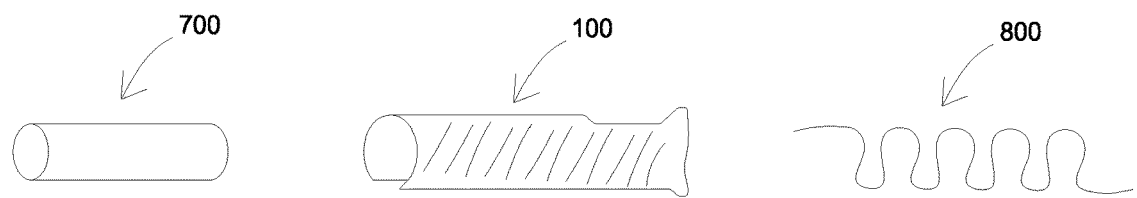
FIG. 11 is a schematic illustration of the anchor, the fishing lure sheet, and the fastener of a kit for assembly another embodiment of a fishing lure.
Figure 12:
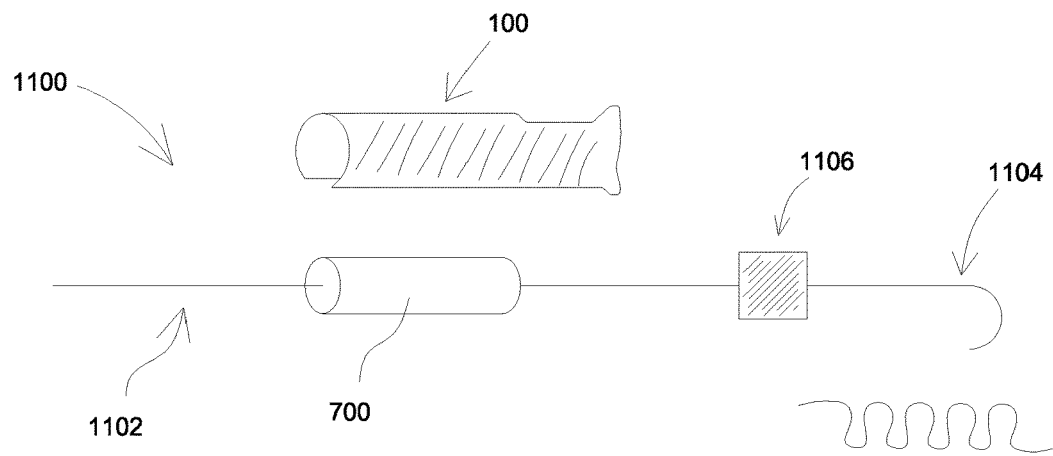
FIG. 12 is a schematic illustration of the components in FIG. 11, with a fishing device having been extended through the anchor.
Figure 13:
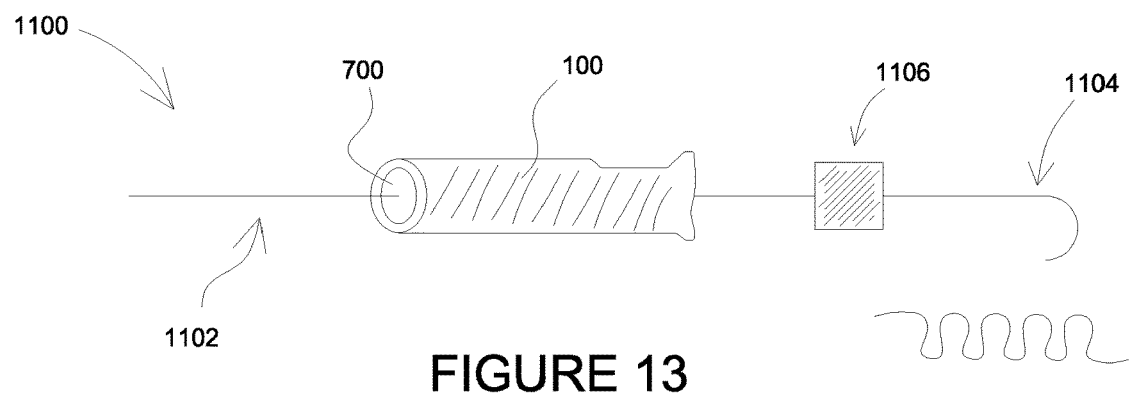
FIG. 13 is a schematic illustration of the components in FIG. 11, with the anchor, the fishing lure sheet, and the fastener disposed in the pre-fastening configuration.
Figure 14:
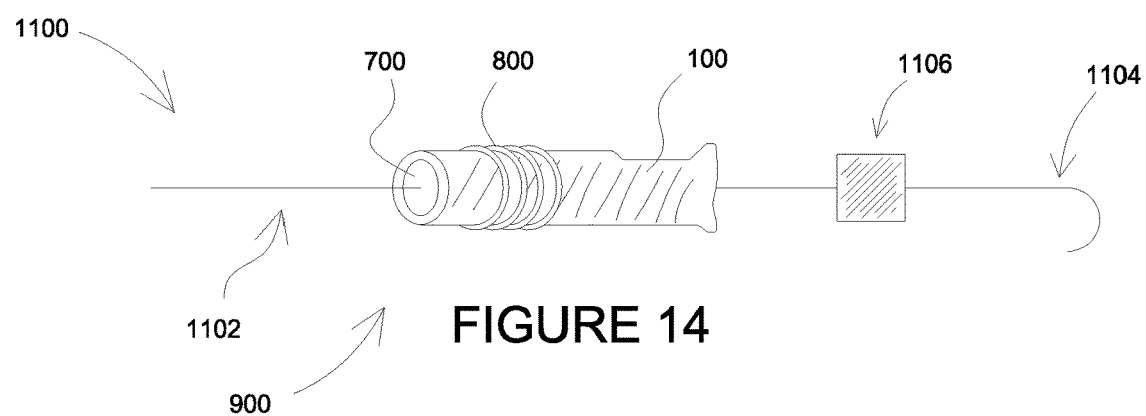
FIG. 14 is a schematic illustration of the components in FIG. 11, with the anchor, the fishing lure sheet, and the fastener disposed in the fishing lure configuration.

Referring to FIGS. 1 and 2, the fishing lure sheet 100 defines a first side surface 100A and a second opposite side surface 100B. The fishing lure sheet 100 is foldable over itself. In some embodiments, for example, a foldable portion 120 of the sheet 100 is foldable over onto itself with the effect that a folded portion 101 is obtained and the sheet 100 becomes disposed in a folded configuration. In this respect, the sheet 100 is configurable in a non-folded configuration (see FIGS. 1 and 11) and a folded configuration (see FIGS. 2 and 3, and 13 and 14).

Referring to FIGS. 3 to 6, in some embodiments, for example, while the sheet 100 is disposed in the folded configuration, the sheet 100 includes a first side surface 100AA and a second side surface 100BB. The second side surface 100BB is disposed on an opposite side relative to the first side surface 100AA. The foldable portion 120 defines a first side surface portion 121A of the first side surface 100AA and a second side surface portion 122A of the second side surface 100BB. The second side surface portion 122A is disposed on an opposite side of the foldable portion 120 relative to the first side surface portion 121A. While the sheet 100 is disposed in the folded configuration, one of the first side surface portion 121A and the second side surface portion 122A (in the illustrated embodiment, this is the first side surface portion 121A) is disposed internally within the folded portion 101, and the other one of the first side surface portion 121A and the second side surface portion 122A (in the illustrated embodiment, this is the second side surface portion 122A) defines an outermost surface of the folded portion 101. In those embodiments where the first side surface portion 121A is disposed internally within the folded portion 101, a first portion 121AA of the first side surface portion 121A opposes a second portion 121AB of the first side surface portion 121A.

In some embodiments, for example, while the sheet 100 is disposed in the folded configuration, the second side surface portion 122A simulates the appearance of a head 136 of an organism (e.g. a fish 140). In this respect, in some embodiments, for example, the second side surface portion 122A simulates the appearance of first and second eyes 138A, 138B of an organism (e.g. a fish 140).

While the sheet 100 is disposed in the folded configuration, the second side surface portion 122A defines a folded state first side surface portion 122AA and a folded state second side surface portion 122AB. The folded state first side surface portion 122AA is disposed on a first side 101A of the folded portion 101, and the folded state second side surface portion 122AB is disposed on a second side 101B of the folded portion 101. The second side 101B is disposed on an opposite side of the folded portion 101 relative to the first side 101A. In some embodiments, for example, at least a portion of (and, in some embodiments, the entirety of) the folded state first side surface portion 122AA simulates the appearance of one side of a head 136 of an organism (e.g. a fish 140), and at least a portion of (and, in some embodiments, the entirety of) the folded state second side surface portion 122AB simulates the appearance of a second opposite side of the head 136 of the organism. In some embodiments, for example, a portion of the folded state first side surface portion 122AA simulates the appearance of the first eye 138A of an organism (e.g. fish), and a portion of the folded state second side surface portion 122AB simulates the appearance of the second eye 138B of the organism (e.g. fish).

In some embodiments, for example, the folded state first side surface portion 122AA defines a surface area of at least 0.125 square inches, such as, for example, at least 0.375 square inches, such as, for example, at least 0.5 square inches, and the folded state second side surface portion 122AB defines a surface area of at least 0.125 square inches, such as, for example, at least 0.375 square inches, such as, for example, at least 0.5 square inches.

Referring to FIGS. 6A and 6B, in some embodiments, for example, the sheet 100 also includes a rear portion 130 that simulates the appearance of a rear portion of an organism (such as, for example, a fish 140). The portion 131AA of the first side surface 100A, defined by the rear portion 130, simulates the appearance of a first side surface of a rear portion of an organism (e.g. a fish 140), and the portion 131BB of the second side surface 100B, defined by the rear portion 130, simulates the appearance of an opposite second side surface of the rear portion of the organism (e.g. a fish 140). In some embodiments, for example, the simulated appearance of a first side surface of a rear portion of a fish 140 includes simulation of the appearance of a first side surface of a tail portion 132 of a fish 140, and the simulated appearance of an opposite second side surface of the rear portion of the fish 140 includes simulation of the appearance of an opposite second side surface of the tail portion 132 of the fish 140. In some embodiments, for example, the simulated appearance of a first side surface of a rear portion of the fish 140 includes simulation of: (i) the appearance of a first side surface of a tail portion 132 of the fish 140, and (ii) the appearance of a first side surface of a dorsal fin 134 of the fish 140, and the simulated appearance of an opposite second side surface of the rear portion of the fish 140 includes simulation of: (i) the appearance of an opposite second side surface of the tail portion 132 of the fish 140, and (ii) the appearance of an opposite second side surface of the dorsal fin 134 of the fish 140.

In some embodiments, for example, the portion 131AA defines a surface area of at least 0.125 square inches, such as, for example, at least 0.625 square inches, such as, for example, at least one (1) square inch, and the portion 131BB defines a surface area of at least 0.125 square inches, such as, for example, at least 0.625 square inches, such as, for example, at least one (1) square inch.

The foldable portion 120 and the rear portion 130 are co-operatively configured such that, while the sheet 100 is disposed in the folded configuration, there is an absence of folding of a rear portion 130 of the sheet 100, and the sheet 100 simulates the appearance of an entirety of an organism (e.g. a fish 140). In this respect, in some embodiments, for example, while the foldable portion 120 is folded over onto itself, and there is an absence of folding of the rear portion 130, the second side surface portion 120A, of the foldable portion 120, simulates the appearance of a head 136 of an organism (e.g. fish 140), and the rear portion 130 simulates the appearance of a rear portion of the organism. Where the organism is a fish 140, in some embodiments, for example, the rear portion being simulated by the rear portion 130 is the tail portion 132 of a fish 140, and in other embodiments, for example, the rear portion being simulated is both of the tail portion 132 of a fish 140 and a dorsal fin 134 of a fish 140.

Referring to FIGS. 3 to 7, while the sheet 100 is disposed in the folded configuration, the foldable portion 120 is securable onto itself for obtaining a fishing lure skin 600. With respect to the fishing lure skin 600, the foldable portion 120 is secured to itself such that: (i) a fishing lure passage 306 is defined, and (ii) a stop 310 is formed and is defined by a constricted portion 306A of the fishing lure passage 306. As explained below, the fishing lure skin 600 is co-operatively configurable with a fishing device 410 such that, while a fishing lure skin 600, formed from the sheet 100, is combined with the fishing device 410, such that the fishing device 410 is disposed within the passage 306, the stop 310 prevents movement of the fishing device 410 relative to the sheet 100 (through the passage 306 at a constricted portion 306A) in a first direction. In some embodiments, for example, movement of the fishing device 410 relative to the sheet 100 (through the fishing lure passage 306), in the first direction, is prevented in response to interference between the fishing device 410 and the stop 310. As well, in some embodiments, for example, the fishing lure skin 600 is also co-operatively configured with the fishing device 410 such that, while the fishing device 410 is disposed within the passage 306, there is an absence of prevention of movement of the fishing device 410 in a second direction that is opposite to the first direction.

In some embodiments, for example, to secure the foldable portion 120, the first side surface portion 120A includes a first joint counterpart 102 and a second joint counterpart 104 for securing the folded portion onto itself at a joint. The first joint counterpart 102 and the second joint counterpart 104 are co-operatively configured such that, while the foldable portion 120 is disposed in the folded configuration, the first joint counterpart 102 and second joint counterpart 104 are disposed for becoming joined to define a joint such that the fishing lure passage 306 is established, and the fishing lure skin 600 is obtained. The fishing lure passage 306 includes a first opening 302 and a second opening 304, and the constricted portion 306A is disposed closer to the first opening 302.

In some embodiments, for example, the joinder of the first joint counterpart 102 and the second joint counterpart 104 is effected via sewing. In example embodiments, the joinder is effected using an adhesive, such as, for example, glue. In example embodiments, the joinder is effected using releasable coupling. In some embodiments, for example, the releasable coupling is effected via a snap type mechanism defined by the first joint counterpart 102 and the second joint counterpart 104. In some embodiments, for example, the releasable coupling is effected via hook and loop fasteners, such as Velcro™.

Figure 8:
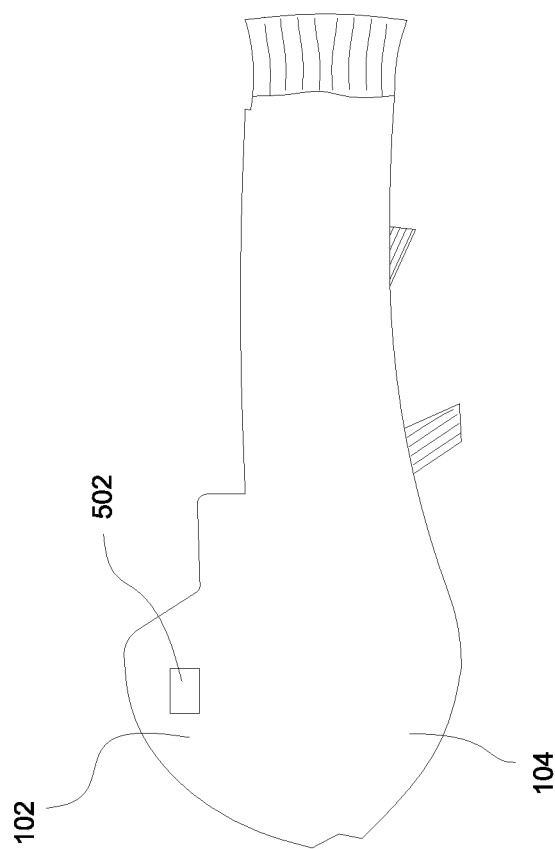
FIG. 8 illustrates a first side of a fishing lure sheet having an activatable joining medium.

Referring to FIG. 8, in some embodiments, for example, an activatable joining medium 502 is provided and is configured for effecting the joinder of the first joint counterpart 102 and second joint counterpart 104. The activatable joining medium 502 is disposed on the same side surface upon which the first joint counterpart 102 and the second joint counterpart 104 are disposed. In some embodiments, for example, the activatable joining medium 502 includes an adhesive strip that is occluded by a removable film (such as, for example, a removable strip), and is activated in response to removal of the film, so as to reveal the adhesive for effecting the joint. In some embodiments, for example, the adhesive strip is a two-sided adhesive strip.

In some embodiments, for example, the foldable portion 120 and the rear portion 130 are co-operatively configured such that, while the fishing lure sheet 100 is disposed in the folded configuration, and also while the foldable portion 120 is secured onto itself such that the fishing lure skin 600 is obtained, there is an absence of folding of the rear portion 130. In this respect, and referring to FIGS. 3 to 7, in some embodiments, for example, the rear portion 130 of the fishing lure skin 600 is not folded over. By not being folded over, freedom of movement of the rear portion 130 is enhanced.

Figure 9:
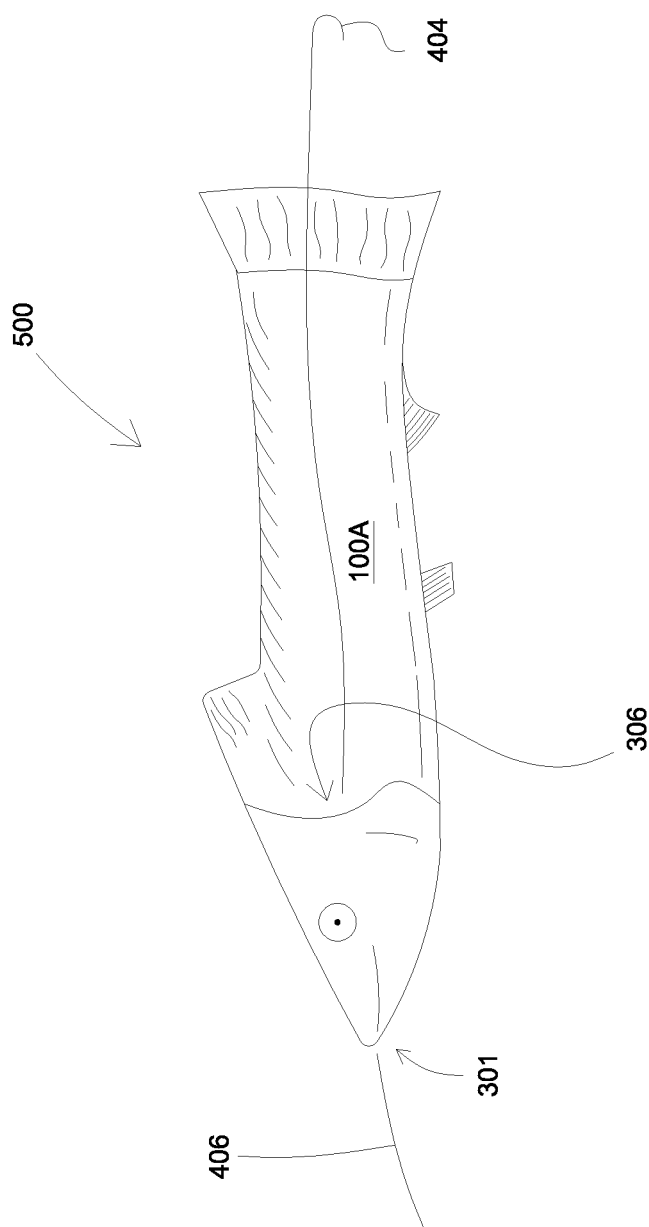
FIG. 9 is a front perspective view of a modified fishing device configuration including the fishing lure skin of FIG. 3, combined with a fishing device.
Figure 10:
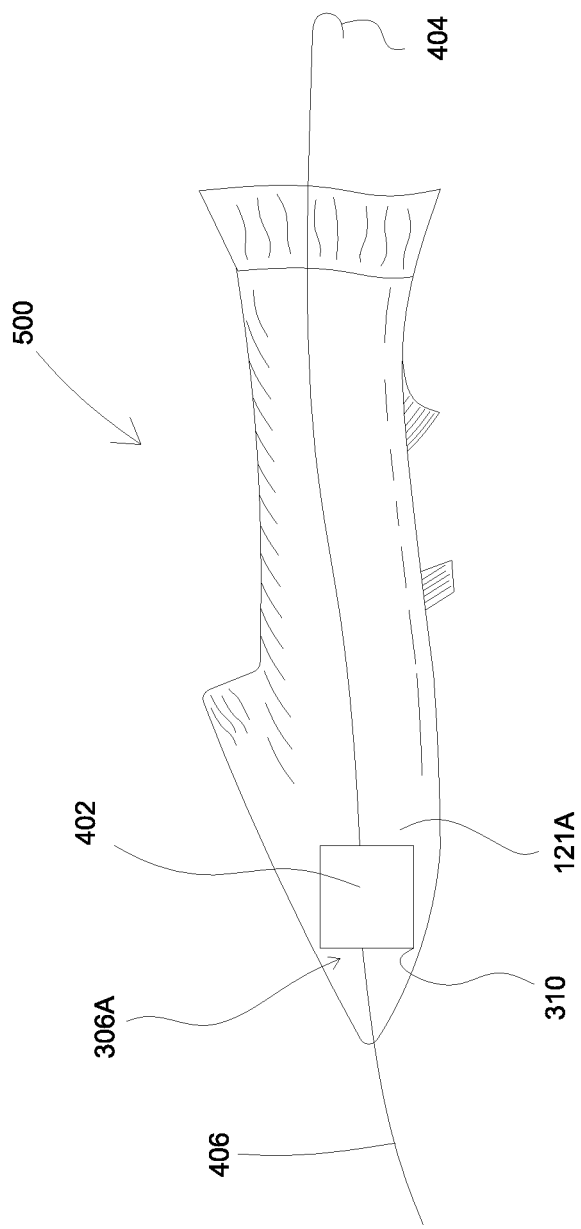
FIG. 10 is identical to FIG. 9, and illustrates a front perspective view of a modified fishing device configuration, with the folded state first side surface portion having been removed for clarity.

Referring to FIGS. 9 and 10, the fishing lure sheet 100 is configured for co-operating with the fishing device 410 for obtaining a modified fishing device configuration 500. In the modified fishing device configuration 500, the fishing lure skin 600 is provided such that the stop 310 and the fishing lure passage 306 are established, and the fishing device 410 extends through the fishing lure passage 306 and is disposed relative to the stop 310 such that the stop 310 prevents movement of the fishing device 410, relative to the sheet 100 (and through the passage 306 at the constricted portion 306A) in a first direction. As well, in some embodiments of the modified fishing device configuration 500, for example, there is an absence of prevention of movement of the fishing device 410 relative to the sheet 100 in a second direction that is opposite to the first direction. In those embodiments where the fishing device 410 includes a commercially available fishing lure, the lure is encapsulated within a cavity defined within the fishing lure passage 306.

In some embodiments, for example, for obtaining the modified fishing device configuration 500, the fishing lure sheet 100 is, initially, manipulated to obtain the fishing lure skin 600, such that the foldable portion 120 is folded over onto itself and joined, with effect that the stop 310 and the fishing lure passage 306 are established. Referring to FIG. 4, the filament 406, connected to a hook 404 and a weighted body 402, is passed through the fishing lure passage 306, from the second opening 302 to the first opening 301, with effect that the modified fishing device configuration 500 is obtained. In this configuration, movement of the filament 406 from the second opening 302 to the first opening 301 is prevented in response to the interference between the stop 310 and the weighted body 402, while, in parallel, there is an absence of prevention of movement of the filament 406 in the direction from the first opening 301 to the second opening 302.

In other embodiments, for example, for obtaining the modified fishing device configuration 500, the fishing lure sheet 100 is, initially, disposed in an unfolded configuration, and the filament 406, connected to the hook 404 and the weighted body 402, is emplaced in the region of the first portion 120. The foldable portion 120 is then folded over onto itself such that the folded configuration is obtained, and the first and second joint counterparts 102, 104 are joined, such that the fishing lure skin 600 is obtained. By virtue of its emplacement in the region of the first portion 120, upon the folding over of the foldable portion 120 onto itself, the filament extends through the formed fishing lure passage 306, and the formed stop 310 prevents movement of the filament in the first direction in response to interference between the stop 310 and the weighted body 402. In this respect, movement of the filament 406 from the second opening 302 to the first opening 302 is prevented in response to the interference between the stop 310 and the weighted body 402, while, in parallel, there is an absence of prevention of movement of the filament 406 from the first opening 302 to the second opening 302.

Referring to FIGS. 11 to 14, in some embodiments, for example, the fishing lure sheet 100 is configured to co-operate with an anchor 700 and a fastener 800, such that the fishing lure sheet 100, the anchor 700, and a fastener 800 are co-operatively configured for assembly to produce a fishing lure 900. In this respect, in some embodiments, for example, a kit is provided for assembly of a fishing lure coupled to a fishing device 1100 (which includes the filament 1102 (such as a wire), and, in some embodiments, includes a hook 1104), and the kit includes the fishing lure sheet 100, the anchor 700, and the fastener 800. In some embodiments, for example, the kit includes instructions for assembly of the fishing lure.

The anchor 700 is configured for coupling to the filament 406.

In some embodiments, for example, the coupling of the anchor 700 to the filament 1102 is such that the anchor 700 retained to the filament 1102. In some embodiments, for example, the anchor 700 can take the form of an existing hook 1104.

In some embodiments, for example, the anchor 700 includes a bushing which is mounted to the filament 1102 such that: (i) the filament 1102 is extendible through the bushing, and (ii) the anchor 700 is moveable relative to the filament 1102. In some embodiments, for example, the bushing is rotatable about the filament 1102. In some embodiments, for example, the bushing is moveable along the filament 1102. In some embodiments, for example, the bushing is moveable along the filament 1102 and rotatable about the filament 1102. In this respect, the bushing facilitates freedom of movement of the lure 900 relative to the hook 1104. In some of these embodiments, for example, the fishing device 1100 further includes a stop 1106 (such as, for example, a split tubular, such as a split shot, or another weighted body), retained to the filament 1102, for maintaining spacing between the hook 1104 and the anchor 700.

In the folded configuration, the fishing lure sheet 100 defines a cavity 103. The fishing lure sheet 100 and the anchor 700 are co-operatively configured such that, while the fishing lure sheet 100 is disposed in the non-folded configuration, the anchor 700 is emplaceable relative to the fishing lure sheet 100 such that transitioning of the fishing lure sheet 100 to the folded configuration is with effect that the anchor 700 becomes disposed within the cavity 103 (and, in some embodiments, for example, the anchor 700 is encapsulated within the cavity 103), such that the fishing lure sheet 100 and the anchor 700 become disposed in a pre-assembly configuration. While disposed in the pre-assembly configuration, the fishing lure sheet 100 is fastenable to the anchor 700 with the fastener 800, such that the fishing lure sheet 100, the anchor 700, and the fastener 800 are configured in a fishing lure configuration (i.e. the fishing lure 900 is defined). In the fishing lure configuration, an outermost surface 902 is defined, and the outermost surface 902 simulates the appearance of an organism (such as, for example, a fish, a leach, or any other organism which is consumable by a fish).

In some embodiments, for example, the fastener 800 effects releasable coupling of the fishing lure sheet 100 to the anchor 700. In some embodiments, for example, the fishing lure sheet 100, the anchor 700, and the fastener 800 are co-operatively configured such that, while the fishing lure sheet 100 and the anchor 700 are co-operatively disposed in the pre-assembly configuration, the releasable coupling of the fishing lure sheet 100 to the anchor 700, by the fastener 700, is effectible in response to a force applied by a human hand. In some embodiments, for example, the fishing lure sheet 100, the anchor 700, and the fastener 800 are co-operatively configured such that, while the fishing lure sheet 100, the anchor 700, and the fastener 800 are co-operatively disposed in the fishing lure configuration, the releasable coupling of the fishing lure sheet 100 to the anchor 700, by the fastener 800, is defeatable in response to a force applied by a human hand.

In some embodiments, the fastener 800 is defined by one of the fishing lure sheet 100 and the anchor 700. In some embodiments, for example, the fastener includes at least two counterparts, and at least one of the counterparts are defined by the fishing lure sheet 100 and the other ones of the counterparts are defined by the anchor 700. Suitable fasteners include hook and loop fasteners (e.g. Velcro™), co-operating magnets, and one or more buttons.

In some embodiments, for example, the fastener 800 is a separate component from the fishing lure sheet 100 and the anchor 700. In such embodiments, for example, suitable fasteners include clasps, and tying devices (in the embodiment illustrated in FIG. 11, the fastener 800 is in the form of a tying device).

In those embodiments where the fastener is a tying device, in some of these embodiments, for example, the tying device is in the form of a filament, and suitable filaments include threads and wires. In those embodiments, where the tying device is a filament, in some of these embodiments, for example, the surface of the filament is tacky (includes an adhesive) so as to facilitate fastening of the fishing lure sheet 100 to the anchor 700. In those embodiments where the fastener is a tying device, in some of these embodiments, for example, the tying device is in the form of a tape, such as, for example, a two-sided tape.

Whereas some exemplary embodiments are herein described, it will be evident that numerous modifications are possible. Accordingly, the invention should be understood as limited only by the accompanying claims, purposively construed.

The invention claimed is:

1. A fishing lure sheet comprising:
a foldable portion configured for folding onto itself to define a folded portion such that the fishing lure sheet becomes disposed in a folded configuration;
wherein:
while the sheet is disposed in the folded configuration:
the folded portion simulates the appearance of a head of an organism;
there is an absence of folding of a rear portion of the sheet;
the folded portion is disposed for becoming joined to itself such that, in response to the joining, a fishing lure skin is obtained, and with effect that a stop and fishing lure passage are established;
the fishing lure skin is configured for co-operating with a fishing device for establishing a modified fishing device configuration, wherein the fishing device includes a filament and a hook connected to the filament such that the hook translates with the filament; and
in the modified fishing device configuration, a filament of the fishing device extends through the fishing lure passage, and movement of the filament through the fishing lure passage, in one of the directions, is prevented in response to interference between the fishing device and the stop.

2. The fishing lure sheet as claimed in claim 1;
wherein:
the fishing lure skin defines a first side and a second side disposed on an opposite side to the first side;
that portion of the folded portion disposed on the first side defines a surface area of at least 0.125 square inches; and
that portion of the folded portion disposed on the second side defines a surface area of at least 0.125 square inches.

3. The fishing lure sheet as claimed in claim 2;
wherein:
a portion of the folded portion that is disposed on the first side simulates the appearance of a first eye of an organism; and
a portion of the folded portion that is disposed on the second side simulates the appearance of a second eye of an organism.

4. The fishing lure sheet as claimed in any one of claim 2 or 3;
wherein:
that portion of the rear portion disposed on the first side defines a surface area of at least 0.125 square inches; and
that portion of the rear portion disposed on the second side defines a surface area of at least 0.125 square inches.

5. The fishing lure sheet as claimed in claim 4;
wherein:
a portion of the rear portion that is disposed on the first side simulates the appearance of a tail of an organism; and
a portion of the rear portion that is disposed on the second side simulates the appearance of a tail of an organism.

6. The fishing lure sheet as claimed in claim 1;
wherein:
the fishing lure skin defines a first side and a second side disposed on an opposite side to the first side;
a portion of the folded portion disposed on the first side simulates the appearance of a first eye; and a portion of the folded portion disposed on the second side simulates the appearance of a second eye.

7. The fishing lure sheet as claimed in claim 6;
wherein:
a portion of the rear portion that is disposed on the first side simulates the appearance of a tail of an organism; and
a portion of the rear portion that is disposed on the second side simulates the appearance of a tail of an organism.

8. The fishing lure sheet as claimed in claim 1;
the fishing lure skin simulates the appearance of an organism.

9. The fishing lure sheet as claimed in claim 8;
wherein:
each one of a side surface portion of the first side surface and a side surface portion of the second side, independently, simulates the appearance of scales of a fish.

10. The fishing lure sheet as claimed in claim 1;
further comprising:
an activatable joining medium configured for effecting the joinder of the folded portion onto itself.

11. The fishing lure sheets as claimed in claim 10;
wherein:
the activatable joining medium includes an adhesive that is occluded by a removable film strip.

12. A fishing lure sheet comprising:
a foldable portion configured for folding onto itself to define a folded portion such that the fishing lure sheet becomes disposed in a folded configuration, the foldable portion defining a first joint counterpart and a second joint counterpart; and
an activatable joining medium configured for effecting the joinder of the first and second joint counterparts;
wherein:
while the sheet is disposed in the folded configuration:
the appearance of an organism is simulated by the sheet;
the first and second joint counterparts are disposed for becoming joined such that, in response to the joining, a fishing lure skin is obtained, with effect that a stop and a fishing lure passage are established;
the first joint counterpart, the second joint counterpart, and the activatable joining medium are co-operatively configured such that, while the sheet is disposed in the folded configuration and the activatable joining medium has been activated, the first and second joint counterparts are disposed for becoming joined by the joining medium such that, in response to the joining, a fishing lure skin is obtained, with effect that a stop and fishing lure passage are established;
the fishing lure skin simulates the appearance of an organism;
the fishing lure skin is configured for co-operating with a fishing device for establishing a modified fishing device configuration, wherein the fishing device includes a filament and a hook connected to the filament such that the hook translates with the filament; and
in the modified fishing device configuration, a filament of the fishing device extends through the fishing lure passage, and movement of the filament through the fishing lure passage, in one of the directions, is prevented in response to interference between the fishing device and the stop.

13. The fishing lure sheets as claimed in claim 12;
wherein:
the activatable joining medium includes an adhesive that is occluded by a removable film strip.

14. A kit for assembling a fishing lure for coupling to a fishing lure coupled to a fishing device including a filament, comprising:
a fishing lure sheet;
an anchor; and
a fastener;
wherein:
the anchor includes a bushing which is mounted to the filament such that: (i) the filament is extendible through the bushing, and (ii) the anchor is moveable relative to the filament;
the fishing lure is configured for folding onto itself to define a folded portion such that the fishing lure sheet becomes disposed in a folded configuration, such that the fishing lure sheet is configurable in a non-folded configuration and is transitionable from the non-folded configuration to the folded configuration in response to folding onto itself;
in the folded configuration, the fishing lure sheet defines a cavity;
the fishing lure sheet and the anchor are co-operatively configured such that, while the fishing lure sheet is disposed in the non-folded configuration, the anchor is emplaceable relative to the fishing lure sheet such that transitioning of the fishing lure sheet to the folded configuration is with effect that the anchor becomes disposed within the cavity, such that the fishing lure sheet and the anchor become disposed in a pre-assembly configuration;
while disposed in the pre-assembly configuration, the fishing lure sheet is fastenable to the anchor with the fastener, such that the fishing lure sheet, the anchor, and the fastener are configured in a fishing lure configuration; and
in the fishing lure configuration, an outermost surface is defined, and the outermost surface simulates the appearance of an organism.

15. The kit as claimed in claim 14;
wherein:
the fastener effects releasable coupling of the fishing lure sheet to the anchor, such that the fastenability of the fishing lure sheet to the anchor is one of releasable coupling;
the fishing lure sheet, the anchor, and the fastener are co-operatively configured such that, while the fishing lure sheet and the anchor are co-operatively disposed in the pre-assembly configuration, the releasable coupling of the fishing lure sheet to the anchor, by the fastener, is effectible in response to a force applied by a human hand; and
the fishing lure sheet, the anchor, and the fastener are co-operatively configured such that, while the fishing lure sheet, the anchor, and the fastener are co-operatively disposed in the fishing lure configuration, the releasable coupling of the fishing lure sheet to the anchor, by the fastener, is defeatable in response to a force applied by a human hand.

\* \* \* \* \*